Nov. 24, 1931.   J. MEYER   1,833,297
TEMPERATURE CONTROL OF GLASS WORKING OR TRANSPORTING ROLLS
Filed Aug. 8, 1929
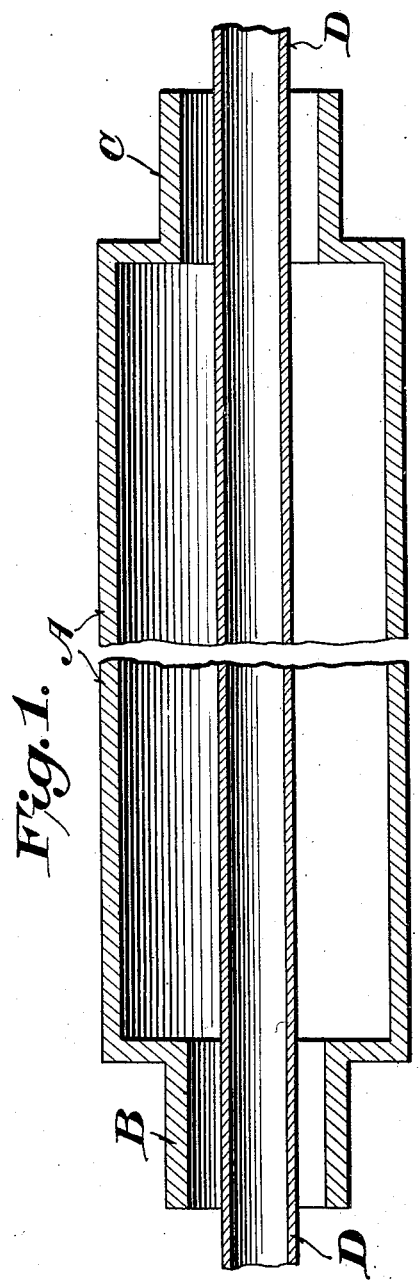
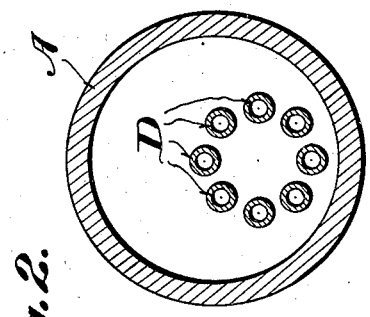
Inventor
Jean Meyer,
By
Attorneys Patented Nov. 24, 1931

1,833,297

UNITED STATES PATENT OFFICE

JEAN MEYER, OF FRANIERE, BELGIUM, ASSIGNOR TO SOCIETE ANONYME DES MANUFACTURES DES GLACES & PRODUITS CHIMIQUES DE SAINT-GOBAIN, CHAUNY & CIREY, OF PARIS, FRANCE

TEMPERATURE CONTROL OF GLASS WORKING OR TRANSPORTING ROLLS

Application filed August 8, 1929, Serial No. 384,335, and in France August 16, 1928.

Rolls are used in glass-house apparatus for several purposes. They are commonly employed as means for fabrication of sheets or ribbons from plastic glass, and for supporting ribbons or sheets of glass after fabrication, but before cooling. In either case the control of their temperature is important.

The glass fabricating rolls are preferably worked at rather a high temperature to avoid causing defects in the glass sheet or ribbon to be fabricated thereby and tend, under the influence of the hot glass with which they are in contact, to become so hot that glass adheres to them. Hence efficient means must be provided to prevent the temperature of such rolls from becoming excessive. Such means have generally taken the form of devices for the circulation of air and water through the interior of the roll, the cooling relied on being that due to the absorption of heat by the cooling fluid in contact with the interior surface of the roll. Difficulty is experienced in such form of cooling in maintaining a uniformity of temperature in different parts of the periphery of the roll, which lack of uniformity tends to cause deformation of the roll by bending, with consequent defects in the glass, such difficulties in cooling arising from a number of causes, such as the formation of steam or air pockets, deposits on the interior walls of the fluid channels, and lack of homogeneity in the metal of the rolls adjacent the cooling passages.

With the rolls used for transporting glass, while the temperatures do not tend to run as high as in the glass forming rolls, it is still necessary to maintain them at fixed temperatures especially when the rolls are used as conveying members in lehrs. With such rolls there is, unless the temperature of different circumferential portions of the periphery of the roll be maintained uniform, a tendency of the roll to warp.

In addition to the above the use of fluid cooling means carried through the rolls in contact with the walls thereof has necessitated packings, which are difficult to maintain tight.

I have discovered that rolls for the purposes named may be efficiently cooled not by conduction as in the old practice, but by radiation from their inner surface, and that this may be accomplished by locating within the interior of a hollow roll a body maintained at a temperature lower than the interior surface of the roll and out of contact therewith.

One type of apparatus for carrying out my invention is shown in the accompanying drawings which represent rolls according to this invention adapted for use as a glass forming element.

The roll A is hollow and is provided with trunnions B and C. Through it and through the trunnions passes a pipe D, through which a proper heat-absorbing fluid, such as air or water, cooled to the desired degree, may be forced. It will be noted that the pipe D is not in contact with the roll.

In the use of such a device heat will be absorbed by the outer surface of the roll A from the hot glass, and will be transferred by conduction to the inner surface of the roll and removed therefrom by radiation to the pipe D to be absorbed by the fluid contained in the latter. The temperature of the surface of the roll will thus depend upon many factors, among these being the amount of heat absorption by the roll, the heat conducting power of the roll, the thickness of the walls of the roll, the difference of temperature between the inner walls of the roll and the temperature of the outside of the pipe D, and the distance between the inner wall of the roll and the outer wall of the pipe. By properly selecting all but the first of these factors (the first being dependent upon working conditions), a desired temperature may be maintained for the exterior surface of the roll. If it should appear that the temperature of the surface of the roll circumferentially is not uniform, (which might result from local variations in the transfer of heat from the outer surface of the roll to the inner surface thereof), such irregularity may be removed by reducing from the inside the thickness of the roll at points where the temperature is too high.

It will be noted that in this system of cooling each portion on the periphery of the roll in any plane at right angles to the axis of the roll successively transfers its heat to each portion located in the same plane on the outer surface of the pipe D, so that in each revolution of the roll the transfer of heat from each of such portions on the interior of the roll to the cooling pipe is uniform. This sharply differentiates this invention from those systems of cooling in which the cooling element rotates with the roll and co-operates directly only with a restricted circumferential portion of the roll. Obviously there exists therefore, no necessity of rotating the pipe D with the roll and preferably it does not rotate.

It is also to be noted that by displacing the pipe D eccentrically to the axis of the roll the cooling effect of the pipe may be intensified to any sector around the axis of the roll. Thus, if the roll is a roll of a lehr conveyor on which glass is resting and the upper surface of which tends to become hotter than the lower surface, the pipe may be shifted upwardly in respect to the center of the rotation of the roll, thus tending to maintain the upper and lower portions of the roll at one and the same temperature, and thereby preventing distortion of the roll.

It is further obvious that in lieu of using a single pipe D, as shown in Fig. 1, a plurality of pipes may be used, as shown in Fig. 2, and that these pipes may be arranged around the perimeter of any figure so selected in shape and in location in respect to the axis of rotation of the roll as to give the desired cooling effect. In Fig. 2 the figure selected is a circle.

Having thus described my invention what I claim as new and desired to secure by United States Letters Patent is:—

1. The hereinbefore described method of temperature control of hollow glass-house rolls, which comprises creating a non-rotating surface within the roll eccentric thereto and cooler than the interior surface of the roll, and cooling such inner surface of the roll by radiation therefrom to such stationary cooled surface.

2. The hereinbefore described method of temperature control of hollow glass-house rolls, which comprises creating a non-rotating surface within the roll cooler than the interior surface of the roll eccentric to the axis of rotation of the roll, the eccentricity being selected in accordance with the desired distribution of cooling around the axis of the roll.

3. The combination with a hollow glass-house roll, of a pipe having circulating therethrough a cooling medium, the pipe within the roll and being free of contact with the roll and with highly conducting substances.

4. The combination with a hollow glass-house roll, of a pipe having circulating therethrough a cooling medium, the pipe within the roll being free of contact with the roll, and not rotating in synchronism with the roll and with highly conducting substances.

5. The combination with a hollow glass-house roll, of a non-rotating surface located within the roll along the length thereof, the surface being located eccentric to the axis of rotation of the roll, and means for cooling such surface.

In testimony whereof I hereunto affix my signature.

JEAN MEYER.